United States Patent
Ette et al.

(10) Patent No.: US 11,096,013 B2
(45) Date of Patent: Aug. 17, 2021

(54) METHOD FOR LOCATING A MARKING UNIT USING AT LEAST ONE BASE UNIT, AS WELL AS A SYSTEM WITH THE MARKING UNIT AND AT LEAST ONE BASE UNIT, AS WELL AS A MARKING UNIT AND BASE UNIT FOR THE SYSTEM

(71) Applicant: Volkswagen Aktiengesellschaft, Wolfsburg (DE)

(72) Inventors: Bernd Ette, Wolfsburg (DE); Volker Wintsche, Dresden (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 16/754,942

(22) PCT Filed: Sep. 20, 2018

(86) PCT No.: PCT/EP2018/075495
§ 371 (c)(1),
(2) Date: Apr. 9, 2020

(87) PCT Pub. No.: WO2019/072518
PCT Pub. Date: Apr. 18, 2019

(65) Prior Publication Data
US 2020/0260222 A1    Aug. 13, 2020

(30) Foreign Application Priority Data
Oct. 9, 2017 (DE) .................. 10 2017 217 932.5

(51) Int. Cl.
*H04W 24/00* (2009.01)
*H04W 4/029* (2018.01)
*H04L 29/08* (2006.01)

(52) U.S. Cl.
CPC ............. *H04W 4/029* (2018.02); *H04L 67/18* (2013.01)

(58) Field of Classification Search
CPC ....... H04W 4/02; H04W 4/029; H04W 64/00; H04L 67/18; H04L 29/08657; H04L 29/08108; H04L 29/08936
(Continued)

(56) References Cited

U.S. PATENT DOCUMENTS

| 5,880,679 A | 3/1999 | Lenart et al. ................ 340/5.6 |
| 2012/0025973 A1 | 2/2012 | Derks et al. ............ 340/539.13 |

(Continued)

FOREIGN PATENT DOCUMENTS

| DE | 19508369 C2 | 1/1998 | ............. B60R 25/04 |
| DE | 19755142 A1 | 6/1999 | ............. G01C 21/00 |

(Continued)

OTHER PUBLICATIONS

International Search Report and Written Opinion, Application No. PCT/EP2018/075495, 36 pages, dated Jan. 17, 2019.

*Primary Examiner* — Temica M Beamer
(74) *Attorney, Agent, or Firm* — Slayden Grubert Beard PLLC (57) ABSTRACT

The invention relates to a method for locating a marking unit of an object by means of at least one base unit, wherein during at least one predetermined transmission time, the marking unit emits a transmission telegram and operates a reception apparatus in order to receive a response telegram from one of the at least one base units as a response to the relevant transmission telegram. The invention provides for the marking unit to define the at least one transmission time in a synchronous mode by means of a predetermined transmission plan assigned to the at least one base unit.

18 Claims, 5 Drawing Sheets

(58) Field of Classification Search
USPC .......................................... 455/456.1, 456.3
See application file for complete search history.

(56) References Cited

U.S. PATENT DOCUMENTS

| | | | |
|---|---|---|---|
| 2014/0035732 A1 | 2/2014 | Karr et al. ................... | 340/10.5 |
| 2014/0228059 A1 | 8/2014 | Jalali ......................... | 455/456.6 |
| 2015/0257109 A1* | 9/2015 | Koullias ........... | H04W 52/0258 |
| | | | 455/557 |
| 2019/0004141 A1* | 1/2019 | de la Broise ......... | G01S 5/0027 |

FOREIGN PATENT DOCUMENTS

| | | | | |
|---|---|---|---|---|
| DE | 102013006927 A1 | 10/2014 | ............ | H04W 12/06 |
| DE | 102014217504 A1 | 3/2016 | ............. | B60R 25/01 |
| DE | 102014218947 A1 | 3/2016 | ............. | G01S 19/16 |
| DE | 102017217932 A1 | 4/2019 | ............... | G01S 1/02 |
| WO | 2019/072518 A1 | 4/2019 | ............... | G01S 5/00 |

* cited by examiner

METHOD FOR LOCATING A MARKING UNIT USING AT LEAST ONE BASE UNIT, AS WELL AS A SYSTEM WITH THE MARKING UNIT AND AT LEAST ONE BASE UNIT, AS WELL AS A MARKING UNIT AND BASE UNIT FOR THE SYSTEM

CROSS-REFERENCE TO RELATED APPLICATIONS

This application claims priority to German Patent Application DE 10 2017 217 932.5, filed on Oct. 9, 2017 with the German Patent and Trademark Office. The contents of the aforesaid Patent Application are incorporated herein for all purposes.

TECHNICAL FIELD

The invention relates to a method for locating a marking unit using at least one base unit. Another designation for such a marking unit is also a tag. By locating, the base unit is found at which the marking unit is currently located. The invention also includes the marking unit and the base unit, as well as a system consisting of at least one base unit and at least one marking unit.

By means of a marking unit, an object can be marked in order to find it again indirectly by locating the marking unit. An example of such an object is a purse, a mobile terminal, a wallet, and a suitcase. The marking unit can for example have the form of a coin or a tag and be attached to the object, and/or placed in the object. A marking unit can communicate with a base unit via a radio link so that when communication is successful, the base unit where the marking unit is currently located is known. Examples of a base unit are a motor vehicle, a mobile terminal and a receiving station that for example can be installed in a building.

By means of such a system consisting of a marking unit and at least one base unit, for example a stolen or lost vehicle can be found, and/or another lost object can be found, and/or the positioning of an object can be enabled without position-determining elements (i.e., without receivers for a GNSS—global navigation satellite system) and without antenna positioning.

The radio-based communication of the marking unit with the at least one base unit can for example be carried out based on Bluetooth (such as UWB—ultra wide band). In order for the marking unit to be able to be moved or transported with the object, it must have a mobile energy supply, i.e., must be operated by battery, for example. However continuous operation or the maintenance of the radio link leads to an undesirably fast discharge of the battery of the marking unit. If in contrast the transmitting apparatus and the reception apparatus of a marking unit are shut off to save energy, a distinction cannot be made from the perspective of a base unit as to whether the marking unit has disconnected the radio link only to save energy, or if the marking unit has been lost or stolen, i.e., is not nearby. It is therefore impossible with conventional means to shut off the transmission apparatus and reception apparatus in the marking unit without producing an ambiguous situation, because from the perspective of the at least one base unit, a distinction cannot be made between energy-saving mode and a loss of the marking unit.

Positioning for an object that is located within the range of a motor vehicle and is known from DE 10 2014 217 504 A1. Depending on reception power of a signal sent by the object, one of several predetermined zones that are defined within the range of the motor vehicle is assigned as the location of the object. However, this requires a multiple antenna arrangement.

It is known from DE 10 2013 006 927 A1 that authentication information can be sent by means of an RFID tag (RFID—radiofrequency identification). The authentication information is used to enable a WLAN network (WLAN—wireless local area network) or a Bluetooth link. An RFID tag does not have its own energy store and is therefore unable to start radio communication. In the event of a theft, it therefore could not actively report.

SUMMARY

An object of the invention is to provide a tag or a marking unit whose energy consumption for signaling its whereabouts is low.

This object is achieved by the subject matter of the independent claims. Embodiments are described in the dependent claims, the following description, and the FIGS.

BRIEF DESCRIPTION OF THE DRAWINGS

In the FIGS.

DETAILED DESCRIPTION

According to a first exemplary aspect of the invention, a method is provided for locating or positioning a marking unit by means of at least one base unit. Another designation for such a marking unit is a 'tag'. A motor vehicle, or a mobile terminal (such as a smart phone, or tablet computer, or smartwatch), or a receiving station, such as for being installed in a building, can be provided as the base unit, for example. The marking unit ascertains its whereabouts relatively, i.e., with respect to a base unit. In other words, the marking unit ascertains whether it is located in the reception range of a base unit, i.e., whether a base unit is located in its transmission range. The location data of the whereabouts can for example be: "Transported in a motor vehicle" or "On a smart phone", or "In the office". The marking unit emits a transmission telegram for this purpose during at least one predetermined transmission time. Another name for a transmission telegram is also a transmission message. Moreover the marking unit operates a reception apparatus in order to receive a response telegram from one of the at least one base units as a response to the respective transmission telegram. Another name for a response telegram is also a response message. The marking unit therefore checks whether it can successfully communicate with a base unit (exchange the transmission telegram and response telegram). Accordingly both the marking unit as well as the respective base unit know where the marking unit is located.

However, the emission of a transmission telegram and the operation of a reception apparatus in the marking unit require energy that in fact should be saved. This is achieved according to the present aspect in that the marking unit emits a transmission telegram only at a very specific transmission time or at very specific transmission times in a synchronous mode, i.e., extremely rarely, for example only during a change of location. To accomplish this, the marking unit ascertains suitable transmission times. In synchronous mode, the marking unit establishes the at least one transmission time by means of a predetermined transmission plan assigned to the at least one base unit.

This yields the benefit that the marking unit must only operate or supply its transmission unit and its reception unit with energy at previously known established times. By means of the transmission plan used in synchronous mode, temporally synchronized establishment of a connection or temporally synchronous communication (exchange of the transmission telegram and response telegram) is enabled. The transmission unit and the reception unit can be deactivated or shut off between the transmission times. Then the at least one base unit does not expect a transmission telegram from a marking unit in any event. Each base unit can therefore resolve the above-described ambiguous situation by using the transmission plan since, from the perspective of the at least one base unit, a distinction can be made between power saving mode and loss of the marking unit by using the transmission plan. Only if a particular transmission telegram is missing or not received at the at least one transmission time according to the transmission plan must the respective base unit assume that the marking unit has been lost.

The invention includes further exemplary embodiments which result in additional benefits.

One embodiment provides that the marking unit operates the reception apparatus in synchronous mode only in conjunction with emitting the transmission telegram. In other words, the reception apparatus remains deactivated or shut off and is only activated or operated within a predetermined time window, wherein the time window is always relative to the transmission time of the transmission telegram. For example, after the emitting of the transmission telegram, the reception apparatus can therefore be operated for a predetermined time, for example within a range of 100 ms to 2 seconds. This can limit the operation of the reception apparatus to such a time window or time intervals in which absolutely the only option is to successfully receive the response telegram as a response to a transmitted transmission telegram. This reduces the energy requirement or energy consumption of the marking unit.

One embodiment can use an individual transmission plan for each base unit. In synchronous mode, the marking unit ascertains its current movement profile for this purpose by means of a movement sensor. The marking apparatus therefore recognizes the extent to which, or speed values and/or acceleration values at which it is currently being moved and/or accelerated. For this purpose, the movement sensor can be an acceleration sensor, i.e., for example a so-called G sensor. The movement profile describes a particular time characteristic of a speed value and/or acceleration value. In so doing, the movement profile can cover a predetermined time period, for example within a range of 10 seconds to 10 minutes. Depending on the ascertained current movement profile, the marking unit estimates, by means of a usage model, which of the at least one base units should currently be located within the transmission range of the marking unit. By using its current movement profile, the marking unit therefore ascertains whether it is located in the surroundings of a base unit, in the surroundings of which a particular characteristic movement profile results for the marking unit. For example, a movement profile characteristic for driving results for example while driving in a motor vehicle due to vibrations and/or shocks in the motor vehicle. In an office when the marking unit lies immobile for example on a table, a correspondingly different characteristic movement profile results. Depending on the estimated base unit that should be located within the transmission range of the marking unit according to the movement profile, the marking unit establishes the at least one transmission time by means of a predetermined transmission plan assigned to this estimated base unit. The marking unit therefore assumes that the estimated base unit is located within the transmission range and transmits the at least one transmission telegram according to the transmission plan, i.e., at the at least one transmission time according to the transmission plan assigned to the estimated base unit. An individual transmission plan can thus be provided for each base unit. The marking unit therefore adapts its transmission behavior to the estimated base unit. Accordingly the number and/or the frequency or transmission rate of transmission telegrams to be transmitted can be adapted to the base unit. The emission of a transmission telegram can thereby for example be limited to a predetermined time period after a change of location. Accordingly, a transmission telegram for example only needs to be transmitted once at the beginning of driving in the base unit, "motor vehicle".

The embodiment yields the benefit that the marking unit only emits at least one transmission telegram when, by using its movement profile, it recognizes that it is in fact located close to a base unit that could respond to the transmission telegram. Correspondingly, it only needs to operate its transmission apparatus to emit a transmission telegram when the emission of a transmission telegram makes sense because a base unit is located within the transmission range. For this purpose, said usage model generates information on an estimated base unit for the ascertained movement profile.

One embodiment provides that, in the event that a transmission telegram or a predetermined number of sequential transmission telegrams remain unanswered, the marking unit switches from synchronous mode to a search mode. If the marking unit therefore does not receive a particular response telegram to a transmission telegram or also to several sequentially emitted transmission telegrams, no successful communication is therefore established with a base unit, and it switches to search mode. In addition or alternatively in corresponding embodiments, search mode can also be switched to in the event that the usage model signals that the current movement profile cannot be assigned. In other words, it is currently impossible to draw an inference from the current movement profile to a reception unit by means of the usage model. In other words, the marking unit is being moved with a movement profile that does not fit any base unit. The movement profile therefore deviates from all known movement profiles. This may also be an indication of the fact that the marking unit is not located in the envisioned or usual surroundings.

In these two cases (no response telegram and/or an unknown movement profile), the marking unit therefore switches from synchronous mode to search mode in which the marking unit emits transmission telegrams at a higher transmission rate or transmission frequency per unit time in comparison to synchronous mode. In other words, more transmission telegrams are sent per unit time than in synchronous mode. This yields the benefit that the probability is increased that another base unit than the anticipated or expected one receives one of the transmission telegrams and responds with a response telegram. In addition or alternatively to the increased transmission rate for the transmission telegrams, it can be provided that the marking unit in some embodiments additionally operates the reception apparatus in search mode independent from emitting the transmission telegrams in order to receive predetermined search telegrams. Another name for a search telegram is also a search message. A search telegram can be sent from a base unit independent of a previously received transmission telegram in order to ask a marking unit to, for example, report with a transmission telegram. In search mode, the marking unit therefore switches to listening mode. In other words, such search telegrams can also be received that can have been sent by a base unit without a previous transmission telegram in order to establish a communication contact from a base unit, or a communication link with the marking unit. Since this search mode is only activated for the two aforementioned cases, the energy consumption of the marking unit remains otherwise minimal since it is only increased when evidence or an indication exists that the marking unit has been lost or is being searched.

If in contrast it happens that a transmission telegram of the marking unit is actually answered by a response telegram, one embodiment provides that the marking unit enters or saves the base unit as the actual, current base unit located within the transmission range whose ID is contained in the response telegram. In other words, the marking unit saves an ID of the responding base unit contained in the response telegram. Then the marking unit uses a transmission plan for the base unit actually located in the transmission range to ascertain at least one additional transmission time for a particular transmission telegram. In other words, the marking unit verifies its current whereabouts by ascertaining the base unit that is actually located within the transmission range of the marking unit by using the ID of the responding base unit in the response telegram. The marking unit therefore saves the confirmed whereabouts. It accordingly switches or sets the at least one transmission time for at least one additional transmission telegram to the base unit actually located in the transmission range.

One embodiment provides that, in the event that the base unit estimated by the usage model and the actual base unit differ, the usage model will be adapted by a predetermined learning algorithm. In other words, when the marking unit misestimates with respect to the base unit located within the transmission range, the usage model is adapted. This yields the benefit that the marking unit independently adapts to altered usage habits of a user of the marking unit. The learning algorithm may for example provide that a predetermined minimum number of misestimations must occur before the usage model is adapted. The learning algorithm may also provide that at least one value for a statistical description of the probability of the whereabouts of the marking unit is adapted.

One embodiment provides that a hidden Markov model is operated as the usage model. This yields the benefit that a precise correspondence between the current movement profile and the usage model is unnecessary, so that a statistical variation in the movement profile that can result when the marking unit is used in the same environment in two different time periods, for example on two different days, still leads to an estimation of a base unit. A hidden Markov model can also be adapted with a learning algorithm known from the prior art in order to take into account a misestimation by the marking unit. A transition matrix and an observation matrix can be generated from a hidden Markov model that can be saved in the marking unit as a usage model.

One embodiment provides that each transmission telegram is sent as a broadcast message, i.e., as a message for several unspecific recipients. This yields the benefit that, in the event of a misestimation with respect to the base unit located in the transmission range, another base unit can still receive the broadcast message and react thereto, for example with a response telegram.

One embodiment provides that, in order to form the usage model, the marking unit is operated in a learning mode in which the marking unit ascertains movement profiles by means of the movement sensor and receives a particular ID of the at least one base unit by means of the reception apparatus, and then engages in an assignment in the usage model of each of the movement profiles of the marking unit to the ID to which the movement profile (38) belongs, and/or that was received while ascertaining the movement profile. In other words, the marking apparatus observes which ID appears to be received while it executes a particular movement profile. If the movement profile is then again measured or recognized later, the usage model then indicates which ID is assigned to this movement profile, i.e., which base unit was within the range of reception of the marking unit at least in learning mode during the process. Accordingly by including the marking unit in learning mode, an automated configuration process is made possible for adjusting or configuring a usage model. Instead of or in addition to ascertaining the movement profiles by means of the movement sensor of the marking unit itself, it can be provided that the movement profiles of the at least one base unit are ascertained by means of a movement sensor and used to form the usage model. For this reason, the marking unit necessarily consumes less or no energy in learning mode. The usage model can be trained outside of the marking unit. A default user profile (standard user profile) can be provided which can be used as a basis by means of said learning algorithm. Accordingly, the synchronous mode can be used or activated in the marking unit with minimum training time. The default user profile can be selected from several by a user. The user can thereby communicate his usage habit.

One embodiment provides that the usage model is selected from several usage models depending on a current date, and/or a current time, and/or depending on a user input. In other words, different usage models can be provided or used for different days/times of day/times/user inputs. Accordingly for example, a usage model for weekdays and a usage model for holidays and/or the weekend can be provided. A usage model for different times of day can be provided (such as morning, midday, evening, night). With his user input, a user can signal or indicate a deviation from the regular use of the marking unit. The embodiment therefore allows a time-controlled model selection, and/or a user-controlled correction of the model selection. A default user profile (standard user profile) can be provided that is employed when a current situation of using the marking unit is unknown.

In order to realize the method as discussed in the preceding, a marking element or a marking unit for marking an object is provided in another aspect. Therefore, a so-called 'tag' is provided. The marking unit has a transmission apparatus for transmitting transmission telegrams and a reception apparatus for receiving response telegrams and search telegrams. Moreover, the marking unit has a movement sensor, for example an acceleration sensor. A control apparatus of the marking unit is configured to realize an embodiment of the method according to the preceding aspect For this purpose, the control apparatus may have at least one processor, and/or at least one microcontroller, and/or an ASIC (application-specific integrated circuit).

The marking unit according to the present aspect provides in an embodiment that said marking unit is missing a receiver for a position signal of a GNSS (global navigation satellite system). An example of such a receiver is a GPS receiver (GPS—global positioning system). In other words, the marking unit is incapable of independently ascertaining its absolute geoposition, i.e., apart from a base unit. The marking unit is therefore not equipped with a position-determining element. This makes its energy consumption particularly low.

In another aspect, a base unit for communicating with a marking unit is provided. The base unit has a communication apparatus for receiving at least one transmission telegram from the marking unit, and for emitting a response telegram. The response telegram thus contains an ID for the base unit. A control apparatus of the base unit is configured to check if the at least one transmission telegram has arrived according to a predetermined transmission plan. In other words, a transmission plan is also used in the base unit. This must correspond with the transmission plan of the marking unit. If a transmission telegram anticipated according to the transmission plan, or a predetermined number of sequential transmission telegrams anticipated according to the transmission plan, are missing, the control apparatus is configured in this case to initiate a predetermined search action. If a transmission telegram is not received on the part of a base unit even though it is anticipated according to the transmission plan, the marking unit is considered lost or missing, i.e., the search action is triggered as a reaction. The base unit and the marking unit therefore have the same transmission plan, and the base unit accordingly knows when the marking unit should transmit a transmission telegram if the marking unit is located at the base unit as planned.

One embodiment provides that said search action includes the base unit signaling at least one predetermined other base unit and/or at least one predetermined outside unit to send, within its particular transmission range, a search telegram to the marking unit. If the base unit does not receive a transmission telegram even though it anticipates one according to the transmission plan, it can at least cause another base unit to emit a search telegram to the marking unit so that the marking unit reports to this other base unit in the response to the search telegram. A search telegram therefore represents a request to the marking unit to emit a transmission telegram. If the marking unit is in search mode (which it would do given the failed communication with the base unit), the reception apparatus of the marking unit is active and can receive the search telegram. In addition or alternatively to a base unit and in some embodiments, a predetermined outside unit can also be asked to emit a search telegram. An outside unit is a technical transmission apparatus or communication apparatus that does not necessarily have to have the features of a base unit, i.e., does not have to be designed to align transmission telegrams with a transmission plan. The search action can therefore provide for example that a search telegram is sent in several outside vehicles in order to ascertain whether the marking unit is located in the respective outside vehicle or in its surroundings. Signaling can be carried out for example by means of an Internet server that is instigated by the base unit to make the at least one other base unit and/or the at least one predetermined outside unit to emit a search telegram to the marking unit.

According to an embodiment, the control apparatus of the base unit is configured to signal to at least one predetermined receiver that the marking unit is at the base unit in the event that a transmission telegram arrives from the marking unit. To accomplish this, the base unit can communicate its ID and/or its current geoposition. Accordingly for example base units can exchange the last confirmed whereabouts of the marking unit with each other. The current or last recognized whereabouts of the marking unit, i.e., the associated base unit and/or its geoposition can for example be signaled or output to a user, for example by means of a display apparatus. The user then recognizes where the marking unit was last located.

Finally and in another aspect, a system with at least one base unit and with at least one marking unit is provided. By means of the system according to this aspect, the at least one marking unit can be operated in an energy-saving manner and nonetheless reliably detect a loss or a theft of the object that is equipped or marked with the marking unit.

In the following, another exemplary embodiment of the invention is described.

The exemplary embodiment explained in the following is another embodiment of the invention. In the exemplary embodiment, the described components of the embodiment each represent individual features of the invention that should be considered independent of each other, and each also develop the invention independently from each other and should therefore be considered as a part of the invention both individually or in another combination other than that shown. In addition, the described embodiment can also be supplemented by other features of the invention than those already described.

Elements having the same functions are, in each case, provided with the same reference numerals in the figures.

Figure 1:
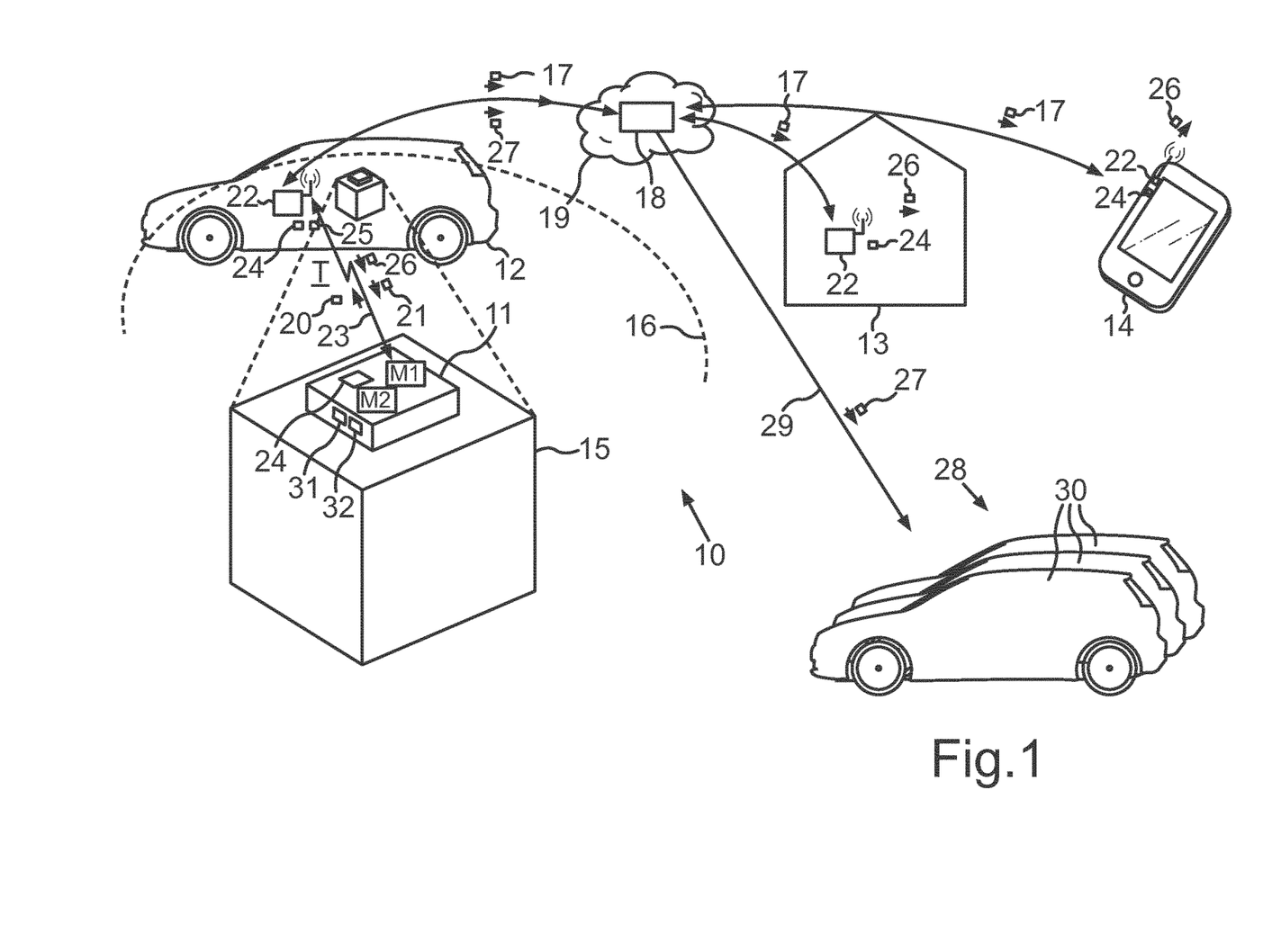
FIG. 1 shows a schematic representation of an embodiment of a system.

FIG. 1 shows a system 10 that can have a marking unit 11 and a plurality of base units 12, 13, 14. The marking unit 11 can be arranged or fastened on or in an object 15. For example, the object 15 can be a briefcase or a keychain. The marking unit 11 can be designed as an electronic device with a maximum dimension of for example within a range of for example 0.5 cm to 10 cm. The marking unit 11 can also be designed as a component of the object 15. The object 15 can then for example be a motor vehicle or a mobile terminal, such as a smart phone. In the following, it is assumed that the object 15 is a portable object, such as a briefcase. The base unit 12 can for example be a motor vehicle. The base unit 13 can for example be a building, such as a home or an office building. The base unit 14 can for example be a mobile terminal, such as a smart phone.

FIG. 1 shows that the object 15 and with it the marking unit 11 are currently carried or transported in the base unit 12, i.e., for example the motor vehicle.

The system 10 provides that the marking unit 11 communicates at predetermined transmission times T with at least one of the base units 12, 13, 14. In the following, it is assumed that it is the base unit 12 that is to be communicated with at the transmission time T shown in FIG. 1. If communication is successful, it is then known in the base unit 12 that the base unit 12 is currently arranged within a transmission range 16 of the marking unit 11. It is therefore known in the base unit 12 that the marking unit 11 and the object 15 with it are located in the base unit 12. The base unit 12 can therefore signal or report the current whereabouts 17 of the marking unit 11, and therefore of the object 15, for example to the other base units 13, 14. For this purpose, it can be provided that the current whereabouts 17 is signaled for example to a server 18 on the Internet 19 which then informs the other base units 13, 14 of the current whereabouts 17 of the marking unit 11 and therefore of the object 15. For this purpose, a particular Internet link can be provided between the operating units 12, 13, 14 on the one hand and the server 18 on the other hand.

Said communication between the marking unit 11 and the base unit 12 arranged within its transmission range 16 can provide that the marking unit 11 emits a transmission telegram 20 for example as a broadcast message at the particular transmission time T in a synchronous mode M1. If the transmission telegram 20 is received by a base unit 12, 13, 14, this base unit (in this case the base unit 12) therefore knows that it is located within the transmission range 16 of the marking unit 11. The base unit 12 that receives the transmission telegram 20 can respond to the marking unit 11 with a response telegram 21 so that the information also exists in the marking unit 11 as to which base unit 12 is currently located within its transmission range 16.

For communication with the marking unit 11, each base unit 12, 13, 14 can have and/or operate a communication apparatus 22. By means of the communication apparatus 22, a radiolink 23 with the marking unit 11 can be provided. The communication apparatus 22 can for example be designed based on the Bluetooth or WLAN (wireless local area network) standard.

The transmission times T at which the marking unit 11 attempts to carry out communication with a base unit 12, 13, 14 can be established by a transmission plan 24. The transmission plan 24 can also be saved or provided in each base unit 12, 13, 14. The transmission plan 24 can provide individual or specific transmission times T for each base unit 12, 13, 14 of the system 10. If a base unit 12 does not receive a transmission telegram 20 at one or more sequential transmission times T specified by the transmission plan 24, this means that the marking unit 11 and therefore the object 15 are not located within the range of or in the base unit 12 as planned according to the transmission plan 24. Accordingly, it is then known within the base unit 12 that the marking unit 11, and with it the object 15, are missing or absent contrary to plan. The base unit 12 can then initiate or perform a predetermined search action 25.

The search action 25 can include the base unit 12 itself emitting a search telegram 26 by means of its communication apparatus 22 which can be received by a marking unit 11 contrary to plan. The marking unit 11 can then respond to the search telegram 26. The search action 25 can also include the base unit 12 emitting a search request 27 to the other base units 13, 14 in which the other base units 13, 14 are asked for their part to emit a search telegram 26 by means of their communication apparatus 22. An object 15 can thereby be found by means of the marking unit 11 that was forgotten or left in one of the other base units 13, 14. In addition or alternatively, it can be provided that the search action 25 includes a search request 27 also being sent to at least one other outside unit 28. This can for example be performed by means of the server 18 via a particular Internet link 29. The outside units 28 can for example each be an outside vehicle 30, i.e., another motor vehicle. For their part, the outside units 28 can then each again emit a search telegram 26 by means of a particular communication apparatus. The object 15 with the marking unit 11 can thereby also be found outside of a transmission range of the operating units 12, 13, 14.

In order for the marking unit 11 to be able to react to a search telegram 26, it must be receptive. To this end, it must terminate synchronous mode M1. The marking unit 11 for its part recognizes when it cannot carry out any communication with a base unit 12 according to the transmission plan 24 at a transmission time T, or several sequential transmission times T. It then does not in fact receive any response telegram 21 to its transmission telegram 20. The marking unit 11 can then switch from synchronous mode M1 to a search mode M2. In search mode M2, it can be provided that the marking unit 11 emits a transmission telegram 20 at predetermined transmission times independent of the transmission plan 24. In particular, the transmission frequency per unit time or transmission rate of transmission telegrams 20 in search mode M2 can be greater than in synchronous mode M1. In addition or alternatively, a reception apparatus 32 of the marking unit 11 can be switched permanently to receive in order to receive the search telegrams 26 of an operating unit 12, 13, 14 and/or an outside unit 28.

In synchronous mode M1, the marking unit 11 must therefore operate or provide with energy a transmission apparatus 31 to transmit the transmission telegrams only at the transmission times T provided according to the transmission plan 24. Likewise, the reception apparatus 32 may only be operated or supplied with energy for a certain time period, for example within a range of 1 second to 1 minute after emitting the transmission telegram 20 if in fact a response telegram 21 can be anticipated in the event of planned communication. The reason for this is the synchronous communication synchronized by the schedule 24.

In search mode M2, the transmission apparatus 31 and/or the reception apparatus 32 must be operated continuously or frequently due to the asynchronous communication.

Figure 2:
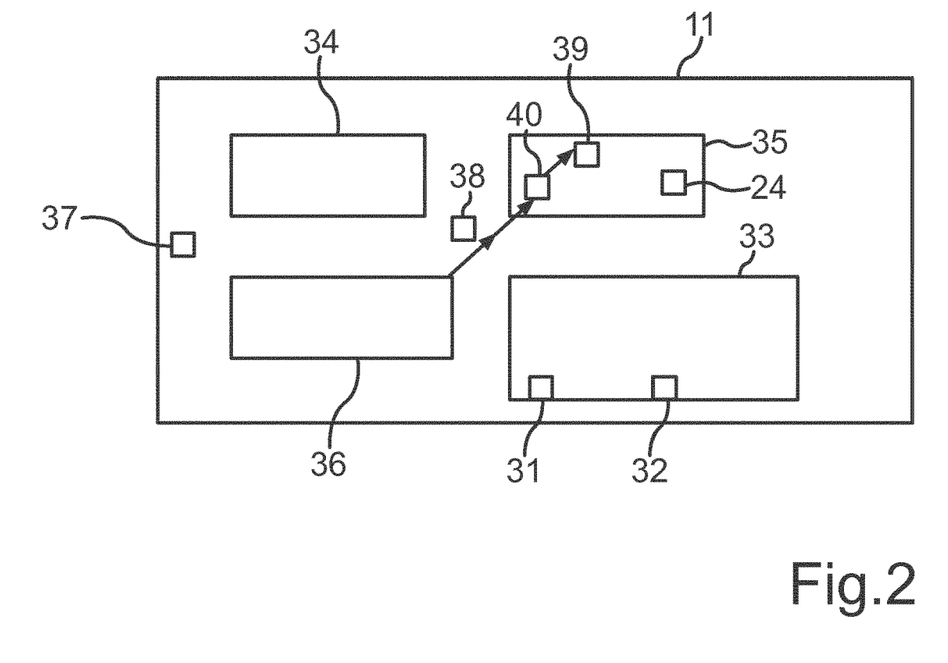
FIG. 2 shows a schematic representation of a marking unit of the system from FIG. 1.

FIG. 2 illustrates the marking unit 11 with even greater detail. The marking unit 11 can have a radio interface 33 for the bidirectional communication by means of the transmission apparatus 31 and the reception apparatus 32. The radio interface 33 can be formed on the basis of a standard such as for example Bluetooth or WLAN.

To supply the marking unit with energy, an energy store 34 such as a battery can be provided. Moreover, a control apparatus 35 can be provided that can for example be formed on the basis of a microcontroller. By means of the control apparatus 35, the transmission plan 24 can be monitored, or evaluated, or used.

As already noted, the transmission plan 24 provides transmission times T which can be coordinated with or adapted individually or specifically to the base unit 12, 13, 14.

However, a position-determining element such as for example a receiver for a position signal from a GNSS (global navigation satellite system) such as for example a GPS (global positioning system) may not be provided in the marking unit 11. Instead, the marking unit 11 can individually ascertain or estimate which base unit 12, 13, 14 should currently be within the proximity. For this purpose, the marking unit 11 can have a movement sensor 36. By means of the movement sensor 36, a movement profile 38 of the marking unit 11 can be ascertained. For this purpose, the movement sensor 36 can for example be formed on the basis of an acceleration sensor. The movement profile 38 can be generated by the movement sensor 36 with reference to shaking movements, and/or lateral accelerations, and/or vibrations. The movement profile 38 when traveling in a motor vehicle differs for example from a position of the marking element 11 on an office table or in a jacket pocket of a user walking on foot.

A timer unit 37 such as a clock can also be provided. A current date and/or a current time can be ascertained by means of the clock 37.

By using the movement profile 38, the control apparatus 35 can recognize or estimate which base unit 12, 13, 14 is probably located currently within the transmission range 16 of the marking unit 11. To assign the movement profile 38 to an estimation 39 of the base unit 12, 13, 14 located within the transmission range 16, a usage model 40 can be provided in the marking unit 11. The usage model 40 can describe a usage pattern or a behavior by a user of the marking unit 11.

Figure 3:
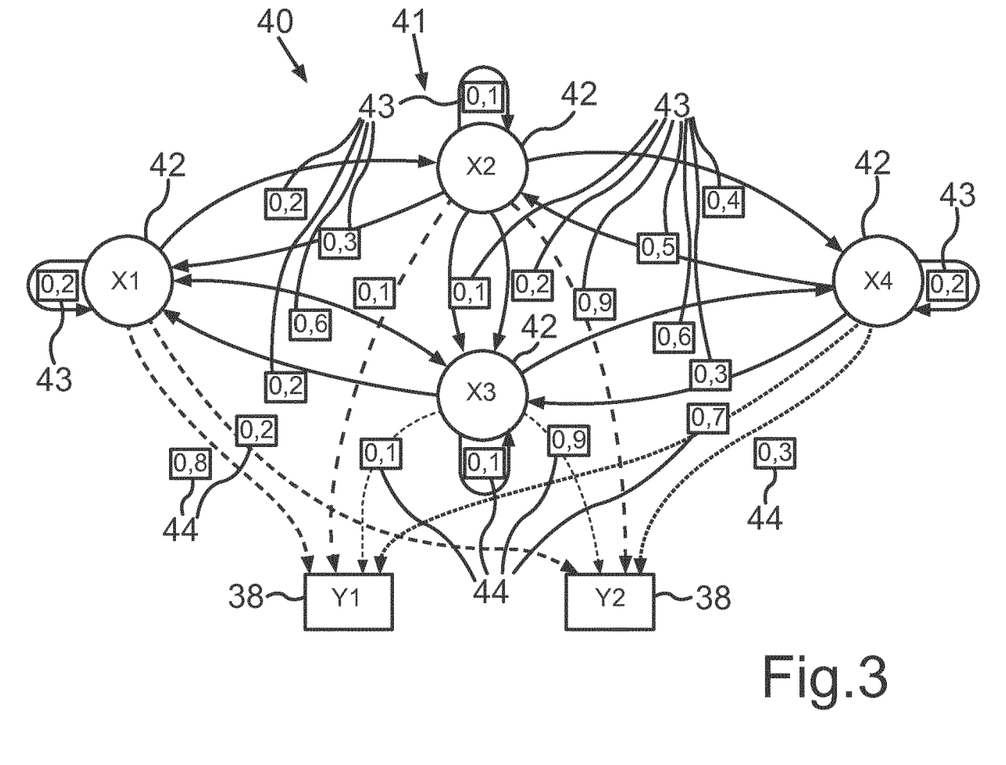
FIG. 3 shows a schematic representation of a usage model of the marking unit from FIG. 2.

FIG. 3 illustrates a potential embodiment of the usage model 40. A hidden Markov model 41 (HMM) can for example be provided as the usage model 40. The HMM 41 can have states 42 (so-called hidden states), each of which can represent a potential or possible whereabouts of the marking unit 11, i.e., a base unit 12, 13, 14 located within the proximity. For example, the following assignment of states 42 can be provided:

X1: at home
X2: on the way without a vehicle
X3: on the way with a vehicle
X4: in the office Depending on the state 42, a certain movement profile 38 results that can be detected by the movement sensor 36. For example, the following movement profiles can be provided in a simple HMM 41 that results in corresponding observations Y:

Y1: Marking unit 11 is not moving
Y2: Marking unit 11 is moving

The states 42 can be switched in the HMM 41 according to predetermined transition probabilities 43 for which example values are indicated in FIG. 3. In each state 42 for the two possible observed movement profiles 38, a particular observation probability 44 results for a particular observation Y of a movement profile 38 for which the example values are indicated in FIG. 3. Based on the usage model 40 and the sequentially observed movement profiles 38, a sequence of state changes in the model 40 can be ascertained, and the current state 42 and therefore the whereabouts can then be ascertained. To accomplish this, algorithms are known from the prior art.

Figure 4:
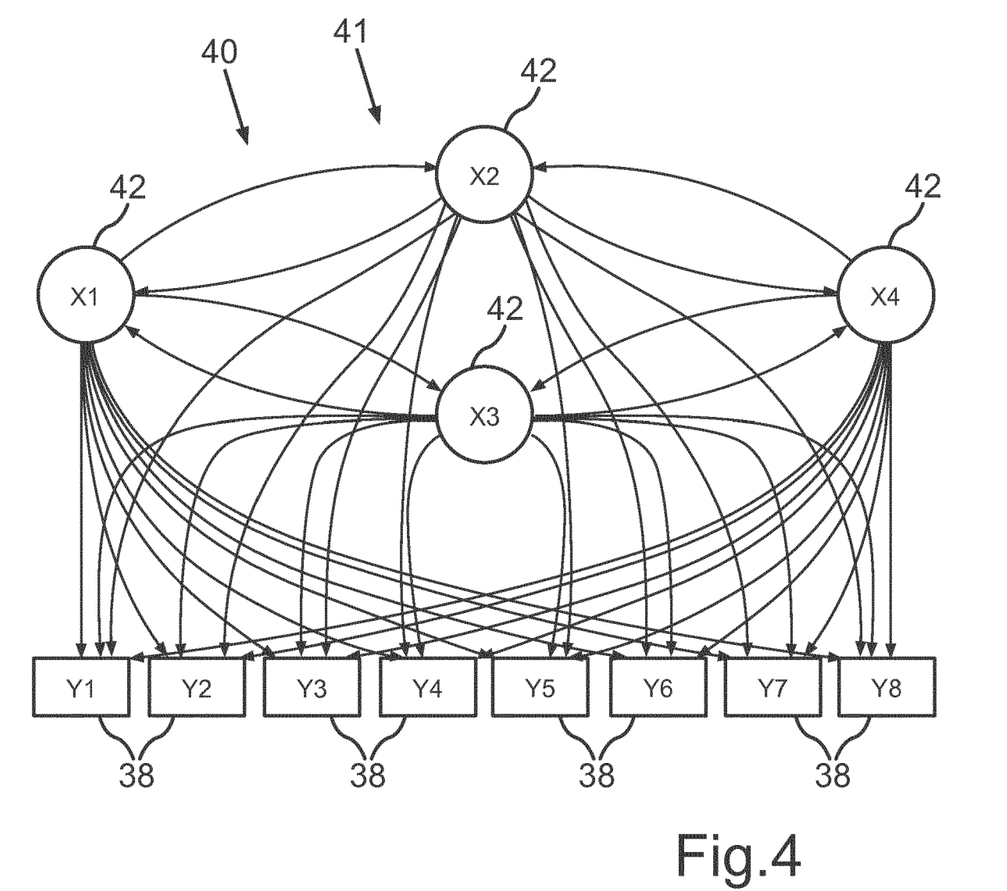
FIG. 4 shows a schematic representation of another time-dependent usage model of the marking unit from FIG. 2.

FIG. 4 illustrates a more complex usage model 40 that can also be based on an HMM 41. The usage model 40 shown in FIG. 4 can provide a time-dependent observation probability for different movement profiles 38. Accordingly, the following observations can be provided:

Y1: Marking unit is not moving, morning
Y2: Marking unit is moving, morning
Y3: Marking unit is not moving, midday
Y4: Marking unit is moving, midday
Y5: Marking unit is not moving, evening
Y6: Marking unit is moving, evening
Y7: Marking unit is not moving, night
Y8: Marking unit is moving, night wherein the times of day, morning, midday, evening, night can for example be ascertained by the timer unit 37.

The usage model 40 can be formed in a learning phase by observing movement profiles 38 by means of a learning algorithm for the usage profile 40, for example a learning algorithm for an HMM 41.

Figure 5:
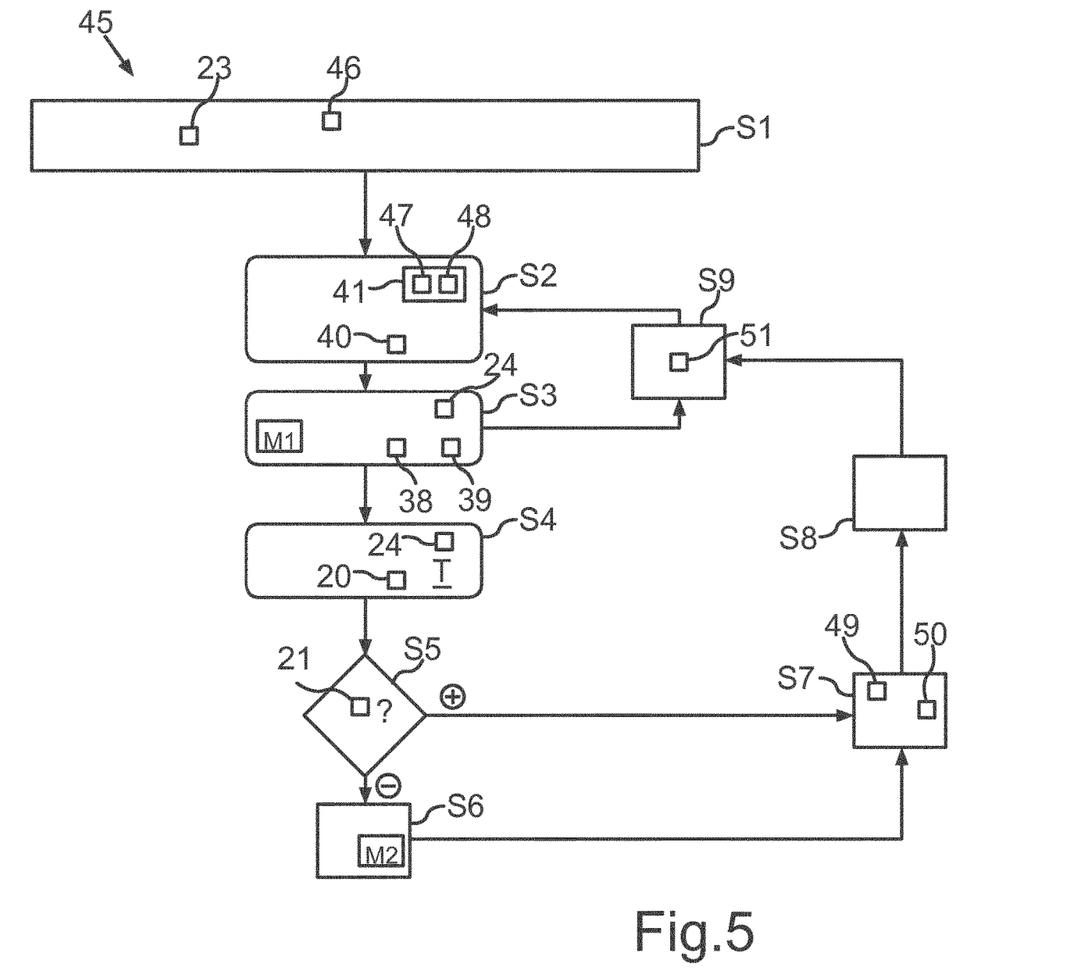
FIG. 5 shows a flowchart of a method that can be executed by the marking unit.

FIG. 5 illustrates an embodiment of a method 45 that can be carried out by the marking unit 11 in order to receive a usage model 40 and then adapt or adjust its transmission behavior according to the usage model 40 and a transmission plan 24.

In a step S1, the marking unit 11 can establish the radio link 23 with the base unit 12, 13, 14 located within the transmission range 16 in a learning mode 46 while using the object 15, for example over one or more days. Within the base units 12, 13, 14, the times at which for example the marking unit 11 is located therein, for example over the course of a day, is therefore known.

In a step S2, an HMM 41 can be formed therefrom which can be transferred in the form of transition matrices 47 and observation matrices 48 to the marking unit 11. The usage profile 40 can be formed therefrom in the marking unit 11. In a step S3, the transmission plan 24 can then be established which for example can provide that, after a state change, a transmission telegram 20 should be sent once at the beginning of a new state 42 to the new base unit 12, 13, 14 which is then located within the transmission range 16. It can also be provided to emit a transmission telegram cyclically or several times during a particular state 42.

Then by means of the movement sensor 36 in synchronous mode M1, a current movement profile 38 can be ascertained, and the base unit 12, 13, 14 located within the transmission range 16 can be estimated therefrom, i.e., the estimated base unit 39 can be ascertained.

The at least one transmission time T can be ascertained for the estimated base unit 39 in a step S4 according to the transmission plan 24, and the transmission telegram 20 can be sent at each transmission time T. In a step S5, it can be checked if a response telegram 21 to a transmission telegram 20 or several sequential transmission telegrams 20 has been received. If this is not the case (symbolized in FIG. 5 by a "−" sign), the search mode M2 can be switched to in a step S6. If a response telegram 21 is received in step S5 (symbolized in FIG. 5 by a "+" sign), a counter 49 can be incremented in a step S7 for successful communication. If the step S6 has been executed, a counter 50 for failed communication can be incremented in step S7.

In a step S8, a probability of success or probability of whereabouts for the particular state 42 can again be ascertained from the states of the counters 49, 50. In a step S9, the usage model 40 can be adapted or modified with a learning algorithm 51 therefor in order to take into account the probabilities of whereabouts that were ascertained in step S8. Such a learning algorithm 51 can for example be provided for an HMM 41. It is known per se from the prior art. The marking unit 11 can be adapted by step S9 to a changing usage habit of a user of the marking unit 11.

An exemplary embodiment of the system according to the invention is again described in the following. The marking unit 11 is termed a tag in the following in order to separately designate this embodiment.

While positioning, the method always uses constant transmission power; this correspondingly minimizes the range of a base unit, i.e. for example a motor vehicle or house. A tag that has not had a connection to the motor vehicle or house for a long time transmits with maximum energy and accordingly has a range of about 100 m. In the house or motor vehicle, the range, i.e., the radius of the transmission range 16, is reduced to 10 m by the reduction in the transmission power.

The tags may, e.g., be not positioned with an additional number of transmission or reception antenna.

The forwarding or calculation of a transmission plan to the tag establishes the number and frequency of the transmission telegrams of the tag.

An acceleration sensor (accelerometer, B-meter or G-sensor) can additionally trigger the transmission plan in response to new events. An example is if an unexpected movement profile is recognized for a certain time.

By selecting the transmission ranges according to detected whereabouts, the transmission power can be reduced.

The transmission power of the tag can be adapted by including the whereabouts and movement profiles of master devices such as a motor vehicle or a mobile terminal as well.

The probability of correct whereabouts is predicted by the movement analysis and by the transmission plan.

A search request can only be granted if a tag is no longer located at the probable locations outside of a certain time request and movement profiles. The tag then switches to search mode and can accordingly be found.

An exchange of the probable locations is carried out by the automobile or a mobile terminal.

All of the transfer matrices and an observation matrix can be derived from a hidden Markov graph or hidden Markov model. In principle, all probable locations are included as the normal whereabouts. Only if a tag does not meet these specifications is positioning possible through a search request by the infrastructure of the system, i.e. for example the motor vehicle.

If a tag is located at the probable whereabouts, a report by the tag according to the transmission plan is possible in an embodiment. Since the motor vehicle/mobile terminal is accordingly synchronized with respect to the transmission plan, positioning at the probable locations of the tag is possible.

The tag, mobile terminal and motor vehicle all transmit broadcast messages.

1. A transmission telegram must be temporally synchronized with the receiver in synchronous mode; this also ensures the searching aspect of a tag relative to the surroundings. To accomplish this, all participants (tag and base units) are equipped with the same calculated transmission plan.
2. Temporal synchrony of the establishment of a connection with one or more receivers is aligned with the times of movement of the receivers.
3. The recognition of the movement of the tag, mobile terminal, and motor vehicle is used to align the position of the whereabouts of the tag.
4. The recognized whereabouts are compared with the most probable whereabouts using suitable statistical means, such as a hidden Markov model. The probability of success is provided in the transmission plan. The next time of a transmission/response telegram is calculated therefrom.
5. The usage model can be selected in advance in order to adapt the transition probabilities and therefore the transmission plan. In addition, a learning algorithm is implemented to adapt the probabilities in order to recognize or update the usage behavior of the tag.
6. Assignments of the whereabouts are performed exclusively by the position-determining elements of the motor vehicle or mobile terminal. It is accordingly unnecessary to install a position-determining element in the tag. The base unit at which the tag is currently located only has to be verified.
7. A positioning function with the assistance of an RSSI measurement (RSSI—received signal strength indication) and triangulation measurements can be omitted.
8. Since the presumably achieved model states Xn (n is a natural number, see for example FIG. 3 and FIG. 4: X1, . . . , X4) of the system are known to the system when a transmission telegram is successfully dispatched, the accuracy is increased.
9. Since the most probable locations are made known to the motor vehicle, tag and mobile terminal, reports by the system within the motor vehicle/mobile terminal are not excessively frequent and can specifically occur explicitly within predetermined time periods.

An example of this: If a tag is transported with a motor vehicle in the luggage compartment, then the motor vehicle and/or mobile terminal will measure simultaneous acceleration values. Accordingly for example a usage model for the tag can be calculated in a mobile terminal. When the transmission plan is exchanged with the tag, the nature of the acceleration profiles is exchanged as well. Even though the transmission range of the tag is scarcely greater than the extent of the motor vehicle such as 50 m, the tag is still reached after kilometers in the motor vehicle. The transmission plan is supplied with entries that contain the usage case "Transportation in a motor vehicle".

If a tag is taken into the house from a motor vehicle, the motor vehicle will no longer reach the tag within the required time in the transmission plan. However, the mobile terminal recognizes the tag after being set down in the house. The synchrony of events and locations is again adapted and communicated to all in the next synchrony exchange. That is in this case, the mobile terminal, motor vehicle and tag.

The events and movement recognition then cause a transmission plan to be compiled by means of the learning algorithm which communicates the transmission time and movement profiles to the tag. Saving this data accordingly also indicates the current most probable location.

If a tag deviates strongly from the information in the transmission plan and no responses are received in the unit of time of the transmission plan from the motor vehicle or mobile terminal after a dispatched transmission telegram of the tag, it may be considered missing. Only then does a tag switch to search mode since it no longer recognizes its connection to the storage locations in the previously learned movement profiles. The last positive exchange of the synchronization telegram informs the user of the last whereabouts of the tag. Accordingly, the user can search at the last whereabouts, or he knows of a suspected last storage location.

If the tag can no longer establish a permanent connection to the motor vehicle or mobile terminal, the tag, or the object marked therewith, is lost or missing. All motor vehicles can accordingly recognize a search telegram from the tag by a unique, unchangeable identifier or ID.

The mobile terminal trained by the tag itself initiates the search request to the server which in turn informs all motor vehicles to search for the ID.

Moreover, there are mobile terminals with an APP (application, user program) that recognize the direction of the tag by turning the smart device. A wide-area search with only mobile terminals is offered but has the problem that the distribution of this APP is not available on all mobile terminals. Users of mobile terminals do not install the additional APPs on their device, or generally switch Bluetooth and WLAN off for reasons of standby current.

New antennas do not have to be installed in the motor vehicle. The communication apparatus of the infrastructure of motor vehicles takes over the search for the lost tags. The search requests are for example configured anonymously and do not have a large base load since establishing the connection for requests is part of smaller communication traffic.

Accordingly, a search procedure can be provided as follows:

1. A search request is registered through a mobile terminal and server.
2. A theft process is triggered, and then a tag is activated to transmit to other motor vehicles within an environs of for example about 100 m, or generally within a range of 10 m to 10 km.

3. The GPS coordinates are transferred by a mobile terminal or motor vehicle to a server to safely recover items/objects, or respectively tags.

The method for determining the transmission times T may be, e.g., configured as follows.

1. Algorithm

FIG. 3 shows an example of a derived HMM graph from the perspective of a tag. The tag only knows the time, and whether it is being moved. The transition probabilities of the hidden state change are adapted to the user behavior by the learning algorithm. The calculation is performed in the tag with the aim of creating the transmission plan.

In addition, the information on the times at which the tag should move and stop according to the usage behavior is saved. The usage behavior can be selected in advance by a user interface on a display device (such as a mobile terminal). In this case, pseudonyms such as "employee", "frequent traveler" or "vacationer" can for example be used in order to specify the standard values of the transition probabilities and observation probabilities when starting the system in the tag. The user has the options of parameterizing time periods of his use and the type of use. It is therefore possible to save several usage models in the tag. From the observation Y, a transmission telegram to the receivers, the motor vehicle or mobile terminal, is derived. Moreover, the usage models reflect the unit of time for the entire day or for a time period of Monday through Friday.

This time-based usage model is shown in FIG. 4. For the sake of clarity, the depiction of the transition probabilities has been omitted in this case. As can be seen with just four hidden states $X_n$ and eight emissions or observations $Y_n$ (2 movement states during 4 times of day), things are already complex. All transition matrices and one observation matrix can be derived from such a graph.

Whether an object was forgotten, lost or stolen cannot be found from this usage model. However, the usage behavior can thereby be depicted. The instances of stolen, lost and forgotten can for example be ascertained as follows:

1. A tag is moved at a time in which, according to usage behavior, it is not moved or is moved with a predetermined threshold probability (such as at night), and does not have any contact with the motor vehicle, or smart phone, or another base unit.

Consequently, it was probably stolen.

2. The tag is not located in the proximity of the motor vehicle and/or smart phone or another base unit even though this is highly probable according to usage behavior:

the tag was forgotten when one was previously in the office or at home, or the tag was lost when one was previously on the way at indeterminate locations.

This is carried out until either a response telegram is received, or the next $X_{n+1}$ state is reached. The transmission power can be additionally increased if there has not been a connection for a long time with the mobile terminal or motor vehicle.

2. Evaluation and Transmission Plan

If a response telegram is recognized by the tag as a search request from several motor vehicles, the mode of the tag is set to synchronous listening M2. Since this synchronous mode M2 with a temporal sequence is known to the mobile terminal and the motor vehicle, the tag does not have to continuously listen to the radio path and can accordingly further save energy.

A tag with a transmission plan can therefore coordinate its expected times. A valid response telegram from the mobile terminal or motor vehicle to the tag communicates to the tag its actual hidden state $X_n$. Since the tag does not have any position-determining elements in the hardware, the valid transmission telegrams that have arrived at the mobile terminal or motor vehicle are sufficient for position determination. The whereabouts at which a valid transmission telegram has arrived in the motor vehicle or mobile terminal are used for display in the motor vehicle or mobile terminal. Accordingly, the last reference location of the tag can always be reliably indicated.

If a tag reaches the observation state $Y_n$, the following modes of the transmission plan are set.

a) dispatch temporally-synchronous transmission telegrams according to the transmission plan b) wait for temporally-synchronous response telegrams from the mobile terminal or vehicles c) repeatedly dispatch transmission telegrams d) Energy-saving mode when the battery life is coming to an end 3. Telegram Types Generally, the telegrams are always provided with the name of the function, unique ID/identifier of the tag, the type of command and optionally other attributes.

<Name><ID_Number><Command><Attribute1> <Attribute2>. . .

3.1 tag of the mobile terminal or vehicle (general base unit)

3.1.1 Transmission telegrams:

Transmission telegrams are dispatched according to the common transmission plan. Each participant, i.e., mobile terminal, motor vehicle and tag, must know this table. This telegram is kept very short in order to minimize transmission power.

<Carloss><ID_TAGx><synchro><HiddenStateNumber> wherein "Carloss" is an example of a protocol name, ID_TAGx is the ID of the tag, "synchro" is the ID for a transmission telegram, and HiddenStateNumber is the estimated model state $X_n$ (estimated base unit 39).

The following telegram is available for exchanging the transmission plan. The calculation is performed on the tag according to the calculated and learned HM model; to accomplish this, the values of the transfer matrices and an observation matrix are transmitted to the tag.

This is only performed once. Then the tag always transmits according to its current transmission plan.

The mobile terminal and motor vehicle as well calculate the same transmission plan according to the transfer matrices and the observation matrix for the tag. The master of the calculations is in the tag since tags can have different user behavior.

<Carloss><ID_TAGx><synchroTable><Matrices>

3.1.2 Response telegrams

The response telegrams are kept short in order to keep the transmission power low.

<Carloss><ID_Ownerof mobile terminal|ID_OwnerVeh> <synchro> <HiddenStateNumber> where "ID_Ownerof mobile terminal|ID_OwnerVeh" is the ID of the base unit, "synchro" is the ID as a response telegram, and "HiddenStateNumber" is the actual model state (i.e., the actual base unit).

The user behavior is transmitted by the following telegram.

<Carloss><ID_OwnerVeh><synchroTable><Matrices>

3.2 Mobile terminal or vehicle (general base unit) of the tag 3.2.1 Search telegrams These telegrams indicate the current search status of the tag of the mobile terminal or motor vehicle <Carloss><ID_Ownerof mobile terminal|ID_OwnerVeh><synchro><HiddenStateNumber> for transferring the model to the tags.

<Carloss><ID_OwnerVeh><synchroTable><Matrices>

The telegram is sent if a tag was missed by the mobile terminal or motor vehicle. The tag can accordingly recognize its current hidden state Xn and further align the user profile.

<Carloss><ID_Ownerof Mobile|Terminal|ID_OwnerVeh <missing><UserProfile><HiddenStateNumber>

4. Flowchart (FIG. 5)

The implementation occurs in all base units and in the marking unit so that each participant can create a transmission plan from the transition matrices and the observation matrix.

5. Tag hardware

The minimum hardware requirements of the tag can be seen in FIG. 2. Tags without a movement sensor are also possible; however, the battery life is significantly reduced.

Overall, the example shows how a method for positioning an object by means of a marking unit without a position-determining sensor can be provided by the invention.

LIST OF REFERENCE NUMBERS

10 System
11 Marking unit
12 Base unit
13 Base unit
14 Base unit
15 Object
16 Transmission range
17 Search request
18 Server
19 Internet
20 Transmission diagram
21 Response diagram
22 Communication apparatus
23 Radio connection
24 Transmission plan
25 Search action
26 Search telegram
27 Search request
28 Outside units
29 Internet connection
30 Outside vehicle
31 Transmission apparatus
32 Reception apparatus
33 Radio interface
34 Energy store
35 Control apparatus
36 Movement sensor
37 Timer
38 Movement profile
39 Estimated base unit
40 Usage profile
41 Hidden Markov model
42 Model state
43 Transition probability
44 Observation probability
45 Method
46 Learning mode
47 Transition matrices
48 Observation matrices
49 Counter
50 Counter
M1 Synchronous mode
M2 Search mode
T Synchronization time The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measures cannot be used to advantage. Any reference signs in the claims should not be construed as limiting the scope.

What is claimed is:

1. A method for locating a marking unit of an object using at least one base unit; wherein
during at least one predetermined transmission time, the marking unit emits a transmission telegram and operates a reception apparatus in order to receive a response telegram from one of the at least one base unit as a response to the relevant transmission telegram;
the marking unit defines the at least one transmission time in a synchronous mode using a predetermined transmission plan assigned to the at least one base unit;
in the synchronous mode, the marking unit ascertains its current movement profile using a movement sensor to ascertain the transmission plan; and wherein
depending on the ascertained current movement profile, estimates, using a usage model, which of the at least one base unit should currently be located within the transmission range; and depending on the estimated base unit, selects the transmission plan assigned to the estimated base unit.

2. The method of claim 1, wherein the marking unit operates the reception apparatus in synchronous mode only in conjunction with emitting the at least one transmission telegram.

3. The method of claim 1, wherein in the event that a transmission telegram or a predetermined number of sequential transmission telegrams remain unanswered, and/or in the event that the usage model signals that the current movement profile cannot be assigned, the marking unit switches from synchronous mode to a search mode in which the marking unit emits transmission telegrams at a higher transmission rate in comparison to synchronous mode, and/or in which the marking unit additionally also operates the reception apparatus independent from emitting the transmission telegrams in order to receive predetermined search telegrams.

4. The method of claim 1,
wherein in the event that a transmission telegram is answered by a response telegram, the marking unit saves an ID of the responding base unit contained in the response telegram as the actual, current base unit located within the transmission range, and/or uses a transmission plan for the base unit actually located within the transmission range to ascertain at least one additional transmission time.

5. The method of claim 4, wherein in the event that the estimated and the actual base unit differ, the usage model is adapted using a predetermined learning algorithm.

6. The method of claim 1, wherein a hidden Markov model is operated as the usage model.

7. The method of claim 1, wherein in order to form the usage model, the marking unit is operated in a learning mode in which the marking unit ascertains movement profiles of the at least one base unit using one or more of the movement sensor and/or a movement sensor of a mobile terminal, and undertakes an assignment in the usage model of each of the movement profiles to the particular base unit to which the particular movement profile belongs.

8. The method of claim 1, wherein each transmission telegram is emitted as a broadcast message.

9. A marking unit for marking an object, wherein
the marking unit has a transmission apparatus for transmitting transmission telegrams and
a reception apparatus for receiving response telegrams and search telegrams, wherein
a control apparatus of the marking unit is configured to perform the method of claim 1.

10. The marking unit of claim 9, wherein the marking unit has a movement sensor and a receiver for a position signal of a GNSS is not comprised.

11. A base unit for communicating with a marking unit of claim 9, wherein
the base unit has a communication apparatus for receiving at least one transmission telegram from the marking unit, and for emitting a response telegram with an ID of the base unit, and wherein
the base unit is configured to determine if the at least one transmission telegram has arrived according to a predetermined transmission plan, and if a transmission telegram anticipated according to the transmission plan, or a predetermined number of sequential transmission telegrams anticipated according to the transmission plan, are missing, to initiate a predetermined search action.

12. The base unit of claim 11, wherein
the search action includes one or more of the base unit signaling at least one predetermined other base unit and at least one predetermined outside unit to send, within its particular transmission range, a search telegram to the marking unit.

13. The base unit of claim 11, wherein the base unit is configured to signal to at least one predetermined receiver that the marking unit is at the base unit in the event that a transmission telegram arrives from the marking unit.

14. A system with at least one marking unit according to claim 9 and at least one base unit, wherein the base unit is configured for communicating with the marking unit, wherein
the base unit has a communication apparatus for receiving at least one transmission telegram from the marking unit, and for emitting a response telegram with an ID of the base unit, and wherein
the base unit is configured to determine if the at least one transmission telegram has arrived according to a predetermined transmission plan, and if a transmission telegram anticipated according to the transmission plan, or a predetermined number of sequential transmission telegrams anticipated according to the transmission plan, are missing, to initiate a predetermined search action.

15. The method of claim 3,
wherein in the event that a transmission telegram is answered by a response telegram, the marking unit saves an ID of the responding base unit contained in the response telegram as the actual, current base unit located within the transmission range, and/or
uses a transmission plan for the base unit actually located within the transmission range to ascertain at least one additional transmission time.

16. The method of claim 3, wherein a hidden Markov model is operated as the usage model.

17. The method of claim 4, wherein a hidden Markov model is operated as the usage model.

18. The method of claim 5, wherein a hidden Markov model is operated as the usage model.

* * * * *